Jan. 15, 1952 S. A. YOUNG Re. 23,455

POP-UP VALVE CONNECTION

Original Filed April 2, 1948

INVENTOR.

BY Stephen A. Young,
Robb & Robb,
Attorneys

Reissued Jan. 15, 1952 Re. 23,455

UNITED STATES PATENT OFFICE 23,455

POP-UP VALVE CONNECTION

Stephen A. Young, Delphi, Ind.

Original No. 2,524,723, dated October 3, 1950, Serial No. 18,675, April 2, 1948. Application for reissue February 2, 1951, Serial No. 209,010

9 Claims. (Cl. 4—203)

Matter enclosed in heavy brackets [ ] appears in the original patent but forms no part of this reissue specification; matter printed in italics indicates the additions made by reissue.

This invention relates to a pop-up type drain valve *unit* and more particularly to the [actuator connecting portion thereof] *actuating means and connection thereof with the movable valve member in the unit.*

Heretofore in the art of pop-up drain valves, the [actuator] *actuating means,* [comprises] *has comprised* [a tiltable solid unit] *a ball rod* having a drain exposed portion and a portion disposed exteriorly of the drain, [and] *the latter portion being* operatively associated with *a* suitable [actuating mechanism] *lift rod unit* [usually having] *including* a manually [actuable] *operable* member to effect [unit] tilting *of the ball rod,* to [effect] in turn *effect* valve *member* elevation for draining. *The drain exposed portion of the tilt rod is connected to a valve member which is movable upwardly and downwardly for opening and closing purposes respectively,* the valve *member* seating by gravity for drain closing *in the usual construction, and normally non-removably connected to the drain exposed portion of the ball rod.*

A [The chief] *primary* object of the present invention is to provide a valve [end] *member* of such character that the structure can function as above described, and which [end] *member* is suitable for use with substantially ninety-eight per cent of all *pop-up type drain units* [actuators] now in use.

*A further object of this invention is to provide a valve member which may be removably connected to the ball rod in the pop-up valve unit, and easily assembled in operating connection therewith for actuation thereby.*

*A still further object of this invention is to provide a valve member which is operable by a ball rod in the usual manner, but assembled for positive operation thereby without removal of the ball rod necessarily resorted to in present constructions.*

*A further object of this invention is to provide a valve member including an end portion so constructed and arranged as to permit operation for normal drain opening and closing of said member regardless of the preferred positive connection thereof with the ball rod.*

[The chief feature of the present invention resides in the actuator associated end of the pop-up valve and its dual possible association with the actuator.]

The full nature of the invention will be understood from the accompanying drawing[s] and the following description and claims:

In the drawings Fig. 1 is a sectional view through a conventional pop-up valve and drain combination, the pop-up valve with the included invention being shown in elevation.

Figure 1:
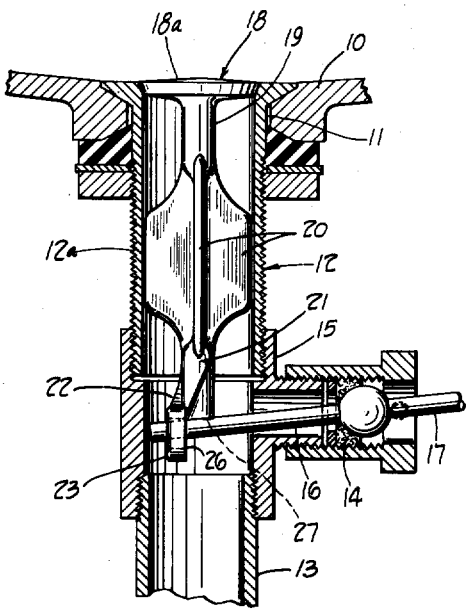

In Fig. 1 of the drawing[s], 10 indicates a sanitary fixture with drain outlet 11 [discharging a drain] *having a pop-up valve unit generally designated* 12 *connected thereto. The unit 12 comprises a plug 12a connected thereto in the usual manner, the plug 12a in turn being* connected to a T 15. The discharge therefrom is *by means of the tailpiece* indicated at 13. In the middle branch of the T there is suitably mounted in sealed but tiltable relation [, as at] *a ball or tilt rod* 14, the [actuator member] *ball rod* having the drain [enclosed] *exposed* end 16 and the [exposed actuable] end 17 *opposite thereto for connection with the usual lift rod unit (not shown).*

The pop-up valve *unit 12 also* includes *the* valve member *generally designated* 18, *including head or closure member 18a,* stem *portion* 19, guide vanes 20, and lower stem extension *or end* 21. The foregoing is *in general* old in the art.

Figure 2:
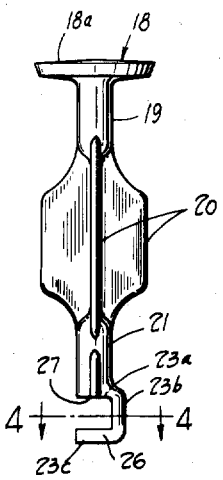
Fig. 2 is an elevational view of said valve taken at right angles to the valve as shown in Fig. 1.
Figure 4:
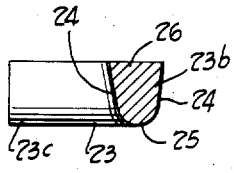
Fig. 4 is an enlarged sectional view taken on line 4—4 of Fig. 2 and in the direction of the arrows.
Figure 3:
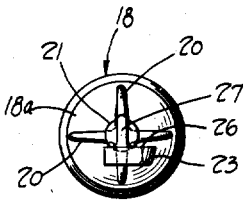
Fig. 3 is a bottom view of the valve.

Reference will now be [had] *made* to Figs. 1 to 3 inclusive wherein said extension *or end* 21 includes a diverging portion 22. Depending therefrom, in offset relation to the stem axis, see Figs. 1, 2, and 3, is the offset *sidewardly open* hook 23, substantially U-shaped in outline, see Fig. 2. *The hook 23 comprises a body having the section 23a, which is connected to the portion 22, a lower section 23c and a vertical section 23b connecting the sections 23a and 23c.* As shown in said figures, and Fig. 4, the [same] *hook 23* in *transverse* section includes inclined sides 24, a semicircular end 25, and a flat opposite end 26, *this formation rendering the valve member 18 including said hook portion more readily manufactured. It will be noted that the face 26 lies in a plane parallel to the axis of the stem portion and guide vanes, but offset therefrom.* [Note that] *The* portion 22 *may preferably terminate* [terminates] in *the same plane as the* shoulder 27 *of end or lower stem extension 21. It should be understood that the construction just above described is preferred but it is also contemplated that the juncture of the U-shaped hook 23 may be substantially above the shoulder 27, so long as the hook is offset as shown*

*in Figure 1, and provides the necessary ball rod receiving opening as shown in Figure 2, the shoulder 27 being provided in the same relative position,* see Figs. 1 to 3.

[With the actuator and parts assembled, and with the valve not applied, it will be obvious that if the valve be dropped into the waste line 12 the shoulder 27 will be disposed above the actuator end 16 for valve elevation.]

[When the actuator and rod are to be connected the valve is turned and the rod now seats in the U-shaped hook or pocket, see Fig. 2 and as shown in Fig. 1.]

[In other words if the valve be dropped into the drain, it still will be actuable by the actuator because shoulder 27 overlies part 16. If it is turned sufficiently the rod seats in portion 23. Certainty of valve-actuator operative association for valve elevation is assured at all times.]

*Assuming that the valve unit 12 has been suitably mounted in the drain outlet of the sanitary fixture 10, with the plug 12a, waste connection 13, T 15, and ball or tilt rod 14 in place, and that the valve member 18 is removed therefrom, assembly of the valve member 18, in the unit will be effected by dropping the said member 18 into the plug 12a. In a large number of instances, the U-shaped hook 23 will drop alongside the end 16 in the T 15, and thus the shoulder 27 will rest on the upper portion of said end. Subsequent tilting movement of the ball rod 14 will thus raise and lower the member 18 to open and close the plug 12a.*

*It may be however, that the section 23c of the hook 23 will come to rest on the upper surface of the end 16, which would normally prevent complete closure of the plug 12a, in which case, tilting movement of the rod 14 may be resorted to, to cause the section 23c to slide to one side or the other of the end 16, and permit the shoulder 27 to come into contact and rest on the said end. Under certain circumstances successive tilting movements of the rod 14 may be required, but in any event the section 23c will slide off the upper surface of the end 16, slight rotational movement of the member 18 taking place during such actuation and the shoulder 27 thus brought into engagement with the end 16.*

*In order to positively interengage the hook 23 and end 16 of rod 14, the valve member 18 may be turned by hand, into a position such as that shown in Figure 1, or reversely thereof. Thus unauthorized removal of the member may be prevented, positive opening and closing of the plug 12a effected, and yet easy cleaning of the waste line accomplished, without disassembly of the rod 14 from the unit, by removing the valve member 18 with simple manipulation whereby to disengage end 16 of said rod from its position between section 23c of hook 23 and shoulder 27.*

*The spacing of the section 23c from shoulder 27 is such that a minimum amount of clearance is provided thereby and positive closure of plug 12a may be effected, by proper manipulation of the ball or tilt rod 14.*

The invention claimed is:

1. In a pop-up valve structure adapted for tilt rod actuation and having a valve portion and vane type guide means longitudinally aligned therewith, the combination of a stem portion coincident with the longitudinal axis of the valve portion and the means and disposed adjacent the latter, a sidewardly disposed U-hook shaped end upon said stem portion and disposed in offset relation to that axis and a shoulder *connected to said stem* extending laterally to said axis and in transverse relation to said end with respect to said axis, said shoulder and hook end departing from a common junction thereof with said stem portion, *said U-hook shaped end having a portion extending below said shoulder.*

[2. A valve structure as defined by claim 1 wherein the hook-shaped end in transverse section includes a flat face, a pair of converging faces and a convexly curved face.]

*2. In a pop-up valve structure adapted for tilt rod actuation and having a valve portion and vane type guide means longitudinally aligned therewith, the combination of a stem portion coincident with the longitudinal axis of the valve portion and the means and disposed adjacent the latter, a sidewardly disposed U-hook shape end upon said stem portion and disposed in offset relation to that axis and a shoulder connected to said stem extending laterally to said axis and in transverse relation to said end with respect to said axis, said U-hook shaped end having a portion extending below said shoulder.*

*3. A removable valve member for pop-up valve units of the class described, comprising, a head, vane type guide means connected thereto, a stem extension connected to said guide means, said extension terminating in a shoulder, and a hook offset bodily therefrom and extending in a direction away from said shoulder.*

*4. A removable valve member for pop-up valve units of the class described comprising, a head, guide means connected thereto, a stem connected to said guide means, a shoulder on said stem, a sidewardly open U-shaped hook connected to said stem, said hook being offset bodily on said stem.*

*5. A removable valve member of the class described comprising, a head, guide means connected thereto, a stem connected to said guide means, a shoulder at the end of said stem, a U-shaped hook connected to said stem near said shoulder and extending away from the same, the faces of said hook lying in planes offset from the axis of said stem.*

*6. A removable valve member of the class described comprising, a head, guide means connected thereto, a stem connected to said guide means, a shoulder at the end of said stem, a U-shaped hook comprised of members each having a face lying in a common plane, one of said members being connected to said stem near the terminus of said shoulder, the common plane aforesaid being spaced from and parallel to the axis of said stem.*

*7. A removable valve member of the class described comprising, a head, guide means connected thereto, a stem connected to said guide means and terminating in a shoulder, a sidewardly open U-shaped hook connected to said stem, said hook comprising a pair of transverse sections, a vertical section connecting said transverse sections, one of said transverse sections being connected to said stem at a point spaced transversely from the axis thereof, all of said sections being thereby offset from said axis.*

*8. In combination, a pop-up valve unit including actuating means, and a valve member rotatable in said unit, said valve member including a stem, a shoulder on said stem abutting said actuating means, and an open hook connected to said stem having a portion extending below said shoulder, said shoulder being adapted to coact with said actuating means and said hook being offset from said shoulder, rotation of said member with the shoulder resting on the actuating*

*means effecting engagement and disengagement of the hook therewith.*

*9. In combination, a pop-up valve unit including actuating means, and a valve member in said unit, said valve member comprising guide means, a stem connected to said guide means, a shoulder on said stem, an open hook connected to said stem, at a point spaced transversely from the axis thereof, the actuating means aforesaid in one position engaging said shoulder and lying to one side of the opening in said hook.*

STEPHEN A. YOUNG.

REFERENCES CITED

The following references are of record in the file of this patent and the original patent:

UNITED STATES PATENTS

| Number | Name | Date |
|---|---|---|
| 1,050,661 | Kelley | Jan. 14, 1913 |
| 1,311,241 | Newton | July 29, 1919 |
| 2,288,767 | Young | July 7, 1942 |